June 3, 1969  P. MEYERER ET AL  3,448,329
VELOCITY MODULATION TUBE, IN PARTICULAR TRAVELING WAVE
TUBE, WITH A MAGNETIC SYSTEM FOR THE BUNDLED
CONDUCTION OF THE ELECTRON BEAM BY MEANS
OF A HOMOGENEOUS MAGNETIC FIELD
Filed March 21, 1966

INVENTORS
PAUL MEYERER
HANS GLIEN
BY *S. Lee & S. Lee*
ATTORNEYS

INVENTORS
PAUL MEYERER
HANS GLIEN
BY *Stief & Stief* ATTORNEYS

United States Patent Office 3,448,329
Patented June 3, 1969

3,448,329
VELOCITY MODULATION TUBE, IN PARTICULAR TRAVELING WAVE TUBE, WITH A MAGNETIC SYSTEM FOR THE BUNDLED CONDUCTION OF THE ELECTRON BEAM BY MEANS OF A HOMOGENEOUS MAGNETIC FIELD
Paul Meyerer, Ottobrunn, and Hans Glien, Munich, Germany, assignors to Siemens Aktiengesellschaft, Munich, Germany, a corporation of Germany
Filed Mar. 21, 1966, Ser. No. 535,867
Claims priority, application Germany, Mar. 25, 1965, S 96,180
Int. Cl. H01j 25/34, 19/80
U.S. Cl. 315—3.5       6 Claims

ABSTRACT OF THE DISCLOSURE

A velocity modulation tube of the travelling wave type having a magnetic system for bunching electrons in a beam having a tubular structure of alternate magnetic rings and non-magnetic spacing rings for suppressing transverse magnetic fields and the rings formed with radial openings which have widths less than the radial dimensions of said rings.

---

The invention relates to a velocity modulation tube, particularly a traveling wave tube, utilizing a magnetic system for the bundled conduction of the electron beam by means of a homogeneous magnetic field extending in the direction of the electron beam, in which, for the suppression of magnetic transverse field components, the tube is surrounded by a tubular structural part which consists of soft magnetic plates and non-magnetic spacing rings alternately disposed with respect to one another.

An important problem in the bundled conduction of the electron beam so strongly out of its axis that a con-homogeneous magnetic field is the avoidance of transverse magnetic interference components in the region of the electron beam axis. Transverse magnetic fields deflect the electron beom so strongly out of its axis that a considerable portion of the beam current can pass, in an undesired manner, to the electrodes adjacent to the electron beam, in particular the delay line. The creation of such magnetic interference components, however, as a result of unavoidable manufacturing tolerances and inhomogeneities in the structure of the magnets, cannot be completely excluded.

In order to effectively eliminate magnetic transverse fields present in magnetic bundling systems, it is already a known practice to arrange within the magnetic system a tubular structural part which surrounds the system axis and consists of an array of highly permeable thin disks which are separated from one another by non-magnetic spacing rings. The permeability of these disks is very great transversely to the longitudinal direction of the magnetic system, so that along the circumference of the disks no potential difference can exist, this being tantamount to a suppression of transverse interference fields.

A further problem in permanent magnet focused velocity modulation tubes lies in the fact that it is generally sought to make it possible to interchange, at will, the tubes in the surrounding magnetic system, whereby the expenditure in the manufacture and the operation of the tube is reduced. The interchangeability, however, presents difficulties if the tube is provided with coupling elements which lead off laterally from the discharge vessel of the tube. This situation is present particularly in high-power traveling wave tubes, wherein the coupling and decoupling of the high frequency energy generally takes place over hollow conductors or coaxial conductors arranged transversely to the tube axis and rigidly connected with the tube. To facilitate the changing of such tubes in the magnetic system without increase of its spatial requirement, it is a known practice to construct the magnetic system of two mirror symmetrical halves which are hinged with respect to one another. If in this known system it should be desired to eliminate magnetic transverse fields by the known arrangement of soft magnetic plates and non-magnetic spacing rings, the tubular structural part thereby formed would, of course, also have to be hinged to enable exchange of the tube, i.e. divided into two halves. Through such division, however, the tubular structural part could no longer fulfill its function in a satisfactory manner, namely the elimination of transverse magnetic field components.

The invention has as its underlying problem that of creating a magnetic focusing device for the generation of a homogeneous magnetic field for the bundled conduction of the electron beam of velocity modulation tubes, especially traveling wave tubes, with arbitrary and free exchangeability of the tube, in which transverse magnetic interference components are effectively suppressed. For the solution of this problem it is proposed, according to the invention, in a velocity modulation tube of the type initially mentioned, that the tubular structural part be provided with a silt or channel-like opening extending in its longitudinal direction to at least one end face of the structural part and that this opening have a smaller transverse width perpendicularly to its longitudinal axis than the wall thickness of the tubular structural part at such opening in a generally radial direction.

In an arrangement according to the invention a tube having the coupling elements disposed transversely to the tube axis can be inserted without difficulty as often as desired into the tubular structural part by reason of its slit or channel-like opening. Interfering magnetic cross field components are efficiently eliminated by the tubular structural part despite such opening, as the transverse field generated in the opening itself is negligibly small if the specified relation between the width and the depth of the opening is fulfilled. It is entirely sufficient to satisfy the specified condition merely in the zone of the channel-like opening. This is advantageously achieved by an arrangement in which the tubular structural part is thickened or enlarged on both sides of the channel-like opening as compared to the average external diameter of the structural part, in which system the enlargement may taper outwardly.

The invention will be explained in detail with the aid of the drawings, in which.

Figure 1:
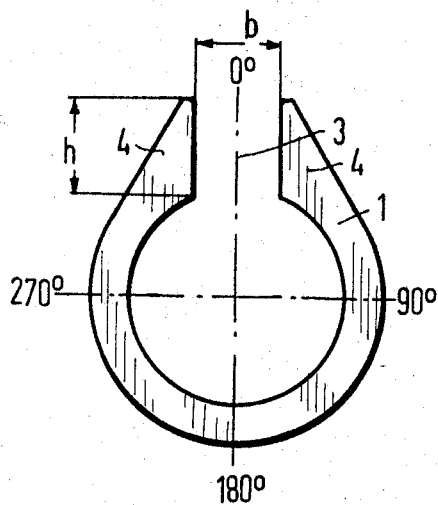
FIG. 1 is an end elevation of the structural tube part according to the invention.
Figure 2:
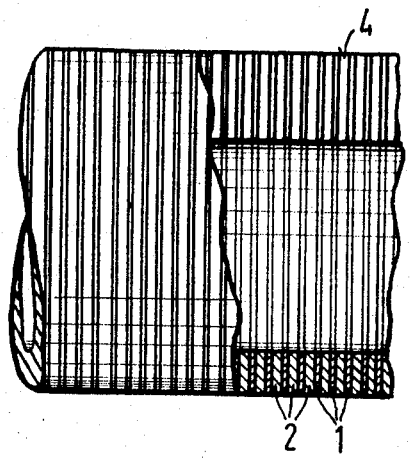
FIG. 2 is a side elevational view of a portion of such part with a portion broken away to show the details thereof.

Referring to FIGS. 1 and 2, the structural part with which, in an arrangement according to the invention, transverse magnetic fields are eliminated, and which will be designated in the following as a "field leveler," consists of alternately disposed soft magnetic thin plates 1 and non-metallic spacing rings 2. The field leveler is provided with a slit or channel-like opening 3 extending in its longitudinal direction over the entire length of the tubular structural part. The soft iron plates 1 and the spacing rings 2 on both sides of the channel-like opening 3 have in each case an outwardly directed projection, so that the field leveler is outwardly enlarged at this point on its circumference. The projections 4 are so dimensioned that the transverse width $b$ of the opening 3, perpendicular to its longitudinal axis, is less than the depth $h$ of the opening, whereby the opening 3 does not produce a troublesome effect on the compensation of transverse magnetic fields.

Figure 3:
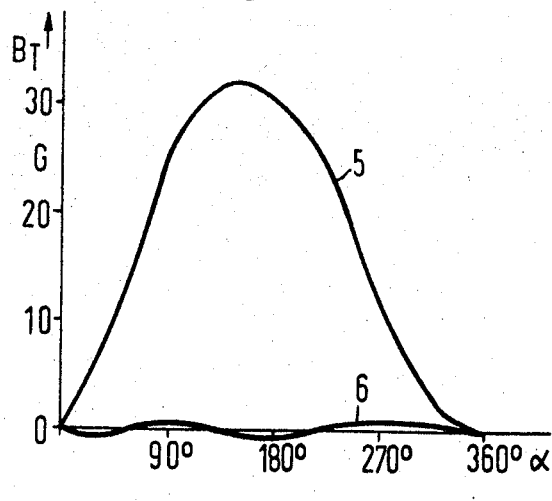
FIG. 3 is a graph illustrating the results achieved by utilization of the construction of FIGS. 1 and 2.

The action of a field leveler according to FIGS. 1 and 2 is apparent from FIG. 3, which represents the measured transverse field $B_T$ of a system for the generation of a homogeneous magnetic field with an axial magnetic induction $B_z=320$ G, with and without a field leveler, in dependence on the azimuthal position of a measuring probe. The curve 5 was measured without field leveler, while the curve 6 was determined for the value of the transverse field with an arrangement according to the invention. The field leveler, accordingly, reduces the magnetic transverse field from above 30 G to a value of less than 1 G.

Figure 4:
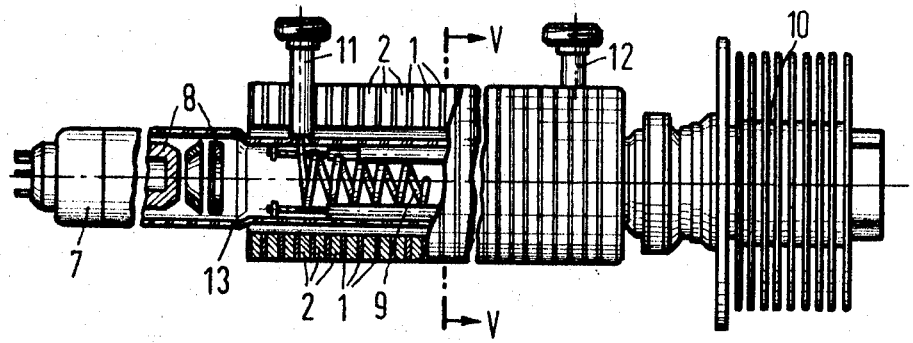
FIG. 4 is a side elevational view, similar to FIG. 2, of the assembly thereof with a traveling wave tube, partly broken away.
Figure 5:
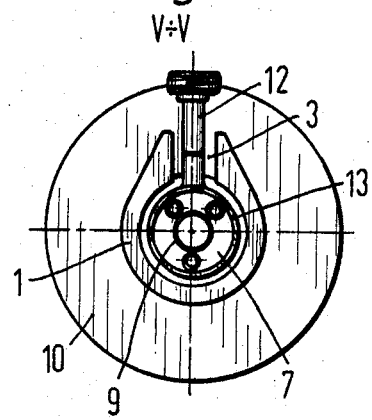
FIG. 5 is a transverse sectional view taken approximately on the line V—V of FIG. 4.

A field leveler according to FIGS. 1 and 2 with a traveling wave tube inserted therein is illustrated in FIGS. 4 and 5, in which the traveling wave tube 7 contains an electron gun 8, a spiral coil 9 as a delay line and an electron collector 10 provided with cooling ribs. For the coupling and decoupling of the high frequency energy of the tube there are provided two coaxial line connections 11 and 12, which extend transversely to the tube axis at the beginning and end of the spiral coil 9, and are rigidly connected with the metal vacuum shell 13 of the tube 7. It is apparent that the tube with the coaxial lines 11 and 12 in the field leveler, which in correspondence to FIGS. 1 and 2, consists of an assembly of soft magnetic disks 1 and non-magnetic spacing rings 2, can be removed and replaced without difficulty, as the coaxial lines 11 and 12 are conducted through the channel-like openings 3 of the field leveler.

Figure 6:
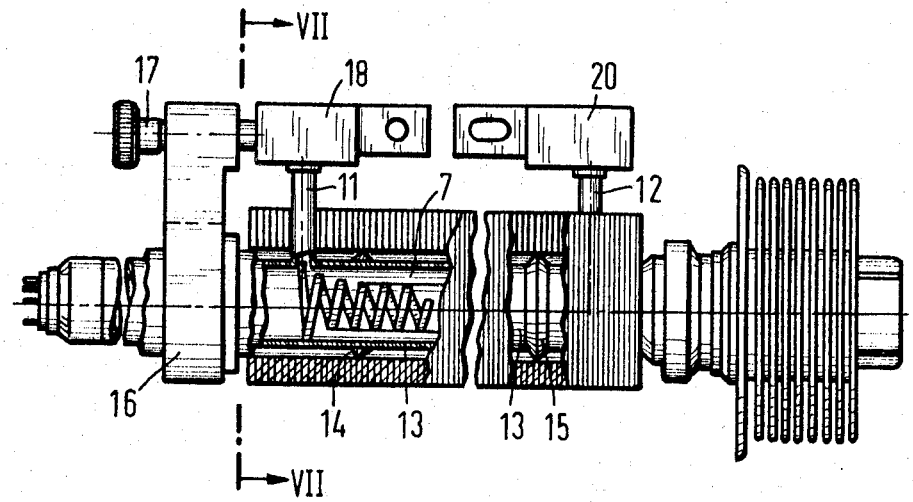
FIG. 6 is a figure similar to FIG. 4 of a particularly advantageous tube arrangement.
Figure 7:
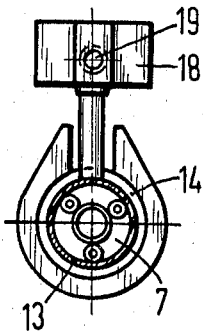
FIG. 7 is a transverse sectional view of the structure of FIG. 6, taken approximately on the line VII—VII of FIG. 6.

FIGS. 6 and 7 illustrate an especially advantageous arrangement of a traveling wave tube in a field leveler according to the present invention. The tube 7, which substantially is the equivalent of the tube illustrated in FIGS. 4 and 5, is centrally supported in the field leveler by means of two centering rings 14 and 15, which are located on the circumference of the metal vacuum shell 13 of the tube. By reason of the structural length of tube 7 it cannot be avoided, especially in the case of a mechanical load occurring at the coaxial line terminals 11 and 12, that the tube shell 13 is subjected to bending tensions, which may cause a certain curvature of the tube axis in relation to the axis of the field leveler. In order to prevent a corresponding undesired sagging of tube 7, the field leveler is attached to the inserted tube with a releasable connection. For this purpose there is provided a carrier part 16, which receives the tube 7 and engages the field leveler or extends into the end face thereof. The carrier part 16 is attached by means of a securing screw 17 to a flange 18 which is disposed at the free end of the input coaxial line terminal 11 and is provided with a corresponding threaded bore 19. The output coaxial line terminal 12 likewise has on its end a flange 20, whereby the two flanges 18 and 20 can additionally support the tube in a magnetic system, and provide a corresponding mechanical relieving of the tube shell.

The arrangement illustrated in FIGS. 4 and 5 as well as that of FIGS. 6 and 7 are advantageously disposed in a magnetic system which consists of two mirror symmetrical halves which are hingedly connected with respect to one another. Such systems are known and therefore need not be here represented in detail.

The invention is not restricted to the examples of construction disclosed. In particular, it is not necessary that the slit or channel-like opening extend over the entire length of the field leveler. On the contrary it may be sufficient in some cases that the opening extend only to one end face of the field leveler, from which a tube with its coupling and decoupling conductors can be inserted. Further, the required relation of width to depth of the air or channel can also be achieved with a constant external diameter of the field leveler if the outer diameter is correspondingly great in comparison to the inner diameter. Furthermore, the invention is applicable not only to a traveling wave tube, but is of significance generally in all velocity modulation tubes which have terminal connection parts extending transversely from the tube and whose electron beam is to be conducted in bundled form by means of a homogeneous magnetic field.

Changes may be made within the scope and spirit of the appended claims which define what is believed to be new and desired to have protected by Letters Patent.

We claim:

1. A velocity modulation tube of the traveling wave type having a magnetic system for bunching electrons in a beam comprising means for suppressing transverse magnetic fields including a tubular structure of alternate magnetic rings and non-magnetic spacing rings, said magnetic rings and said non-magnetic spacing rings formed with radial openings which have widths less than the radial dimension of said rings to form a longitudinal opening, said traveling wave tube mounted within said magnetic and non-magnetic spacing rings.

2. A velocity modulation tube according to claim 1 wherein the portion of said magnetic rings and said non-magnetic rings are enlarged adjacent said longitudinal openings and have a constant internal diameter.

3. A velocity modulation tube according to claim 2 wherein the portion of said magnetic rings and said non-magnetic rings are tapered outwardly adjacent said longitudinal openings.

4. A velocity modulation tube according to claim 1 wherein said traveling wave tube is formed with centering rings which engage the inner diameter of said means for suppressing transverse magnetic fields.

5. A velocity modulation tube according to claim 1 comprising a bracket and mechanical means extending from said bracket to said traveling wave tube to support it within said means for suppressing transverse magnetic fields.

6. A velocity modulation tube according to claim 5 wherein said mechanical means comprises a lead screw means.

References Cited

FOREIGN PATENTS 1,329,084  4/1963  France.

HERMAN KARL SAALBACH, *Primary Examiner.*

SAXFIELD CHATMON, JR., *Assistant Examiner.*

U.S. Cl. X.R.

313—84; 315—5.35; 335—210